United States Patent [19]

Peace

[11] Patent Number: 4,756,726
[45] Date of Patent: Jul. 12, 1988

[54] REGENERABLE DEHUMIDIFIER

[76] Inventor: Terry Peace, 4230 Glendenning, Victoria, B.C., Canada, V8X 2B5

[21] Appl. No.: 932,887

[22] Filed: Nov. 20, 1986

[51] Int. Cl.$^4$ .......................................... B01D 53/04
[52] U.S. Cl. ........................................ 55/275; 55/387; 55/515; 55/DIG. 45
[58] Field of Search ................ 55/274, 275, 316, 387, 55/512, 515, DIG. 45

[56] References Cited

U.S. PATENT DOCUMENTS

| | | | |
|---|---|---|---|
| 232,122 | 9/1880 | Hammesfahr | 55/DIG. 45 |
| 2,210,862 | 8/1940 | Tronstad | 55/274 X |
| 2,216,986 | 10/1940 | Roe | 55/DIG. 45 |
| 2,554,879 | 5/1951 | Race, Jr. | 55/275 |
| 2,578,324 | 12/1951 | Southwick, Jr. | 55/387 |
| 2,649,923 | 8/1953 | Woppman | 55/387 |
| 2,671,526 | 3/1954 | Hunt et al. | 55/275 |
| 3,326,810 | 6/1967 | Dolan et al. | 55/515 X |
| 3,678,662 | 7/1972 | Grote | 55/515 X |
| 3,724,177 | 4/1973 | Grote | 55/316 |
| 3,727,769 | 4/1973 | Scholl | 55/515 X |
| 3,990,872 | 11/1976 | Cullen | 55/274 |
| 4,047,914 | 9/1977 | Hansen et al. | 55/274 X |
| 4,124,116 | 11/1978 | McCabe, Jr. | 55/387 X |
| 4,130,487 | 12/1978 | Hunter et al. | 55/274 X |
| 4,224,366 | 9/1980 | McCabe, Jr. | 55/316 X |
| 4,350,508 | 9/1982 | Santoro et al. | 55/275 |
| 4,391,667 | 7/1983 | Vangbo et al. | 55/387 X |

FOREIGN PATENT DOCUMENTS

| | | | |
|---|---|---|---|
| 20289 | 4/1983 | Japan | 55/316 |
| 45346 | 10/1983 | Japan | 55/515 |
| 147615 | 8/1984 | Japan | 55/316 |
| 1376888 | 12/1974 | United Kingdom | 55/316 |

*Primary Examiner*—Robert Spitzer
*Attorney, Agent, or Firm*—Norman B. Rainer

[57] ABSTRACT

A dehumidifier device is provided for absorbing water vapor from ambient air. The device is comprised of a container constructed of fabric woven from multifilament yarns of fiberglass, and confining granular desiccant material such as silica gel having a visibly distinctive moisture indicator. The fabric is of a critically selected construction that permits visual observation of the confined granules through the fabric while effectively retaining the granules. The device is capable of repeated cycles of absorption of moisture and thermally induced desorption.

7 Claims, 1 Drawing Sheet

REGENERABLE DEHUMIDIFIER

BACKGROUND OF THE INVENTION

This invention relates to a product for adsorbing water vapor from ambient air, and more particularly concerns a device which confines granules of a substance capable of absorbing and desorbing water vapor.

A number of granular solid water-insoluble inorganic desiccant materials are generally available which can reversibly adsorb moisture vapor from air or other gas mixtures while retaining their granular form. Such materials include for example, calcium sulfate, zeolites (e.g. Linde molecular sieves 4A), alumina, magnesia, and silica gel. In their usual manner of use, the granular materials are disposed in columns through which a gas is passed, or disposed in thin layers in horizontally oriented trays which contact the gas to be treated. When the absorbent material becomes fully saturated with water, its absorbing capacity can be restored by heat treatment at temperatures in the range of 100 to 200 degrees centrigrade which drives off the absorbed water. The degree of saturation of the granules can in certain instances be monitored by the addition of trace amounts of visibly distinctive indicator substances. When the indicator substance is a thermally stable, inorganic cobalt compound, the dry form generally has a blue color and the wet form generally has a pink color. The transition to the wet color preferably occurs after saturation of the desiccant with water.

The use of silica gel granules confined within porous containers is well known for maintaining the dryness of sealed enclosures containing equipment or substances sensitive to moisture. Such porous containers are generally cellulosic paper pouches which, although capable of a limited amount of regeneration treatment, do not permit visual observation of the granules. The paper pouches, because of their limited strength and thermal resistance, are restricted to use in small sizes and in service conditions which do not require repeatd regeneration or long term durability to rough handling.

It is accordingly an object of the present invention to provide a dehumidifier device which utilizes desiccant granules containing a visibly distinctive indicator substance.

It is another object of this invention to provide a device as in the foregoing object wherein said desiccant granules possess a large water-holding capacity and have sufficient cohesive strength to resist physical degradation with repeated thermal treatment.

It is a further object of the present invention to provide a device of the aforesaid nature wherein the desiccant granules are confined within a porous container capable of withstanding repeated thermal regeneration of the granules.

It is another object of the present invention to provide a device of the aforesaid nature wherein the confined granules are visibly discernible.

It is a still further object of this invention to provide a device of the aforesaid nature of sturdy and durable construction amenable to low cost manufacture.

These objects and other objects and advantages of the invention will be apparent from the following description.

SUMMARY OF THE INVENTION

The above and other beneficial objects and advantages are accomplished in accordance with the present invention by a dehumidifier device comprising,
(a) a container constructed of fabric woven from multifilament yarns of fiberglass and sealed at the borders of the container by thermally resistant closure means, said fabric being of a translucent nature yet having small interstices between yarns, and
(b) desiccant granules confined within said container, said granules containing a visibly distinctive moisture indicating substance, the size of said granules being larger than the size of the interstices of said fabric.

In preferred embodiments of the device, the container is multi-compartmented and the fiberglass yarns are comprised of continuous filaments. The container is of a generally rectangular configuration, preferably being of a multi-compartmented design and constructed by the joinder of two facing panels of fiberglass fabric. The border extremities of the panels are preferably sewn using fiberglass thread, and separate compartments are bounded by lines of sewn interengagement of the facing panels of fabric. In some embodiments, said two facing panels are integral parts of the same piece of fabric which is folded so as to be doubled upon itself, the fold line constituting part of the border of the container.

The desiccant material is preferably silica gel having a surface area and pore volume chosen for high water absorption, yet having high crush strength.

The visibly distinctive moisture indicating substance is preferably a cobalt compound. The amount of granular material within each compartment is preferably such as to occupy 60% to 85% of the total capacity of the compartment.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
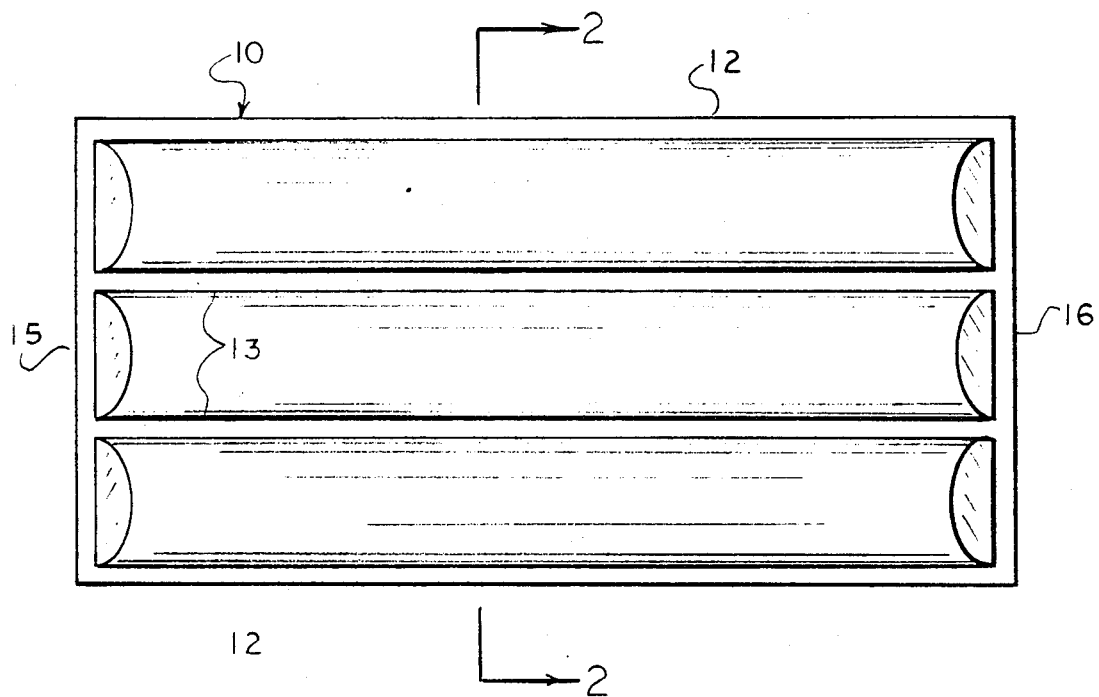
FIG. 1 is a perspective view of an embodiment of the dehumdifier device of this invention.
Figure 2:
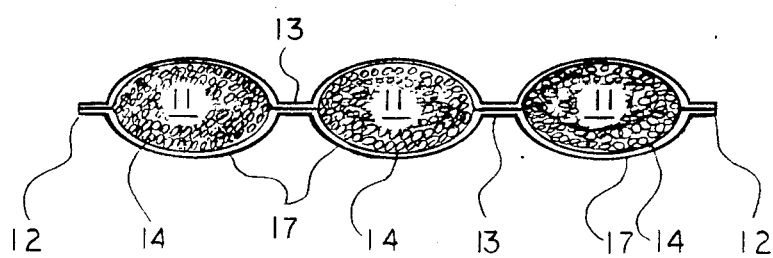
FIG. 2 is a sectional view taken along the line 2—2 of FIG. 1.

Referring to the drawing, an embodiment of the dehumidifier device of this invention is shown comprised of container 10 filled with silica gel granules 11.

The container is formed by sewing together two rectangular pieces of fiberglass woven fabric 17, thereby forming side closure borders 12, and upper and lower closure borders 15 and 16, respectively. Parallel seam lines 13 are also sewn through the two facing fabrics, extending between upper and lower closure borders, and thereby defining elongated compartments 14. In an alternative embodiment, the container may be woven as an integral structure having three compartments. It is to be noted however, that is the production of the device, the upper border edge is left unbound until the granules of silica gel have been emplaced within the compartments. In certain embodiments of the invention, the fabric may be a continuous knitted tube. When flattened, the knitted tube forms two side edges of the container, and the upper and lower closure borders are formed by cutting and sewing. Unravelling of cut edges of the fabric may be prevented by hemming with fiberglass yarn or by application of thermally resistant bonding agents such as silicones and fluoropolymers.

The yarns utilized in the production of suitable fabric are unpigmented continuous multifilament yarns of fiberglass. Each filament within the yarn strand or bundle has a diameter preferably within the range of 0.0001 and 0.0005 inch. The yarn bundle has a minimal twist of between about 0.3 and 1.0 turns per inch and has a diameter of less than 0.007 inch. The fabric construction is preferably a square-type weave having 30 to 50 strands per inch in each direction. However, twill and other weave patterns may be utilized at the same strand and count density. Suitable fabrics will have a weight of between 1 and 8 ounces per square yard. Fabrics of the aforesaid characteristics have been found to possess a translucent characteristic while having small interstices between the yarns. Also, such fabrics possess sufficient tightness of weave to prevent migration of strands during use with attendant change in size of interstices.

A suitable type of silica gel useful in the practice of this invention is indicating Type IV, Grade H, MIL-D-3716-A made by Eagle Chemical Co. of Alabama, U.S.A. The size of the silica gel granules is preferably 6-20 mesh size (U.S. Standard Sieve Series) which defines maximum cross-sectional dimensions in the range of 1.25 to 4.25 mm. Accordingly, the interstices of the fabric should not, with use, exceed 1.25 mm. In the exemplified three compartment device, it is preferable that the silica gel of at least the center compartment be of the indicating type. It has been found that, if the extent of fill of the compartments is less than about 60%, the device is flaccid, permitting considerable mobility of the granules within their compartments. Such mobility promotes attritional degradation of the granules, producing dust-like particles which fall through the fabric.

The dehumidifier device of this invention finds special use within automobiles which must be parked overnight in cold, damp weather conditions which ordinarily produce condensation of water within the automobile. The dehumidifier prevents such condensation, and may be similarly employed in enclosed spaces of boats, aircraft, recreational vehicles, and commerical trucks and vans. When visual observation of the device indicates that the silica gel absorbent is saturated with water, the device is placed in a conventional kitchen oven at a temperature in the range of 100 to 200 degrees centigrade for several hours. The device is then removed from the oven and allowed to cool in a sealed or otherwise moisture free environment. Regeneration of the silica to its dry form may also be done with caution in a microwave oven.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A dehumidifier device comprising:
   (a) a container constructed of fabric woven from continuous multifilament yarns of fiberglass and comprised of several elongated compartments in parallel juxtaposition having borders sealed by thermally resistant closure means, said fabric being of a translucent nature yet having interstices between yarns measuring less than 1.25 millimeter, and
   (b) dessicant granules confined within said container, said granules containing a visibly distinctive moisture indicating substance, the size of said granules being larger than the size of the interstices of said fabric.

2. The dehumdifier device of claim 1 wherein said thermally resistant closure means is a fiberglass yarn utilized in a sewing manner.

3. The dehumidifier device of claim 1 wherein said desiccant granules are silica gel.

4. The dehumidifier device of claim 1 wherein said moisture indicating substance is a thermally resistant inorganic cobalt compound.

5. The dehumidifier device of claim 1 wherein said container is filled to between 60% and 85% of its full capacity with said granules.

6. The dehumidifer device of claim 1 wherein each filament within the yarn has a diameter between 0.0001 and 0.0005 inch, the yarn has a twist of between 0.3 and 1.0 turns per inch, and the diameter of the twisted yarn is less than 0.007 inch.

7. The dehumidifier device of claim 6 wherein said fabric is of square-type weave having between 30 and 50 yarns per inch in each direction, and has a weight between 1 and 8 ounces per square yard.

* * * * *